US011065695B2

(12) United States Patent
Garcia

(10) Patent No.: US 11,065,695 B2
(45) Date of Patent: Jul. 20, 2021

(54) POSITIONING JIG

(71) Applicant: Luis Garcia, Calgary (CA)

(72) Inventor: Luis Garcia, Calgary (CA)

( * ) Notice: Subject to any disclaimer, the term of this patent is extended or adjusted under 35 U.S.C. 154(b) by 904 days.

(21) Appl. No.: 15/614,427

(22) Filed: Jun. 5, 2017

(65) Prior Publication Data

US 2018/0345386 A1 Dec. 6, 2018

(51) Int. Cl.
*B23B 47/28* (2006.01)
*E05D 11/00* (2006.01)
*B25H 7/00* (2006.01)

(52) U.S. Cl.
CPC ............ *B23B 47/287* (2013.01); *B25H 7/00* (2013.01); *E05D 11/0009* (2013.01); *B23B 2247/12* (2013.01); *B23B 2260/004* (2013.01); *B23B 2260/07* (2013.01)

(58) Field of Classification Search
CPC .......... B25B 47/287; B25H 7/02; B25H 7/00; E05D 11/0009; B23B 47/287
USPC ........... 33/667, 675; 269/211; 408/115 R, 97
See application file for complete search history.

(56) References Cited

U.S. PATENT DOCUMENTS

| 597,915 | A |  | 1/1898 | Roosa |  |
|---|---|---|---|---|---|
| 1,187,658 | A | * | 6/1916 | Sauerhering | B25D 5/02 33/675 |
| 1,274,647 | A |  | 8/1918 | Whipple |  |
| 2,842,860 | A | * | 7/1958 | Gray | B25H 7/02 33/667 |
| 3,583,823 | A |  | 6/1971 | Eaton et al. |  |
| 4,684,299 | A |  | 8/1987 | Laliberte |  |
| 4,791,732 | A |  | 12/1988 | Bruno, Jr. et al. |  |
| 4,942,667 | A | * | 7/1990 | Fournier | G01B 11/275 33/228 |
| 4,981,400 | A |  | 1/1991 | Stover |  |
| 5,590,986 | A | * | 1/1997 | Juang | B23B 47/287 408/115 R |
| 5,647,139 | A | * | 7/1997 | Richardson | G01B 5/0025 33/533 |
| 5,807,036 | A |  | 9/1998 | Lostlen |  |

(Continued)

FOREIGN PATENT DOCUMENTS

WO 2007/12315 A1 11/2007

OTHER PUBLICATIONS

Hafele Catalogue, "Drilling Jig (Cat. No. 001.35.001) and Drilling Jig for Handles (Cat. No. 001.31.233)," Decorative Hardware, date unknown, 1 page.

(Continued)

*Primary Examiner* — Lee D Wilson
*Assistant Examiner* — Seahee Hong
(74) *Attorney, Agent, or Firm* — Stephen M. De Klerk

(57) ABSTRACT

A positioning jig for locating drill holes or other targets in a workpiece on which the positioning jig is positioned. The positioning jig includes a pinion body and a pair of arms extending from the pinion body. The pair of arms are engaged with a pinion in the pinion body to provide a rack and pinion mechanism for centering the positioning jig on a workpiece. A jig body including at least one aperture is connected with the pinion body. The jig body may be translated with respect to the pinion body for locating the at least one aperture at a target point on the workpiece for drilling a hole or marking the workpiece.

29 Claims, 15 Drawing Sheets

(56) References Cited

U.S. PATENT DOCUMENTS 8,459,906 B1 6/2013 Schmitt
2007/0101598 A1 5/2007 Miro

OTHER PUBLICATIONS

Photographs of Jig Similar to the Jig shown in WO 2007/12315A1, date unknown, 3 pages.
Photograph of Jig retrieved on Jul. 15, 2015 from http://images.meredith.com/wood/images/p_461_1.gif, 1 page.
Photograph of Jig retrieved on Jul. 15, 2015 from http://ecx.images-amazon.com/images/I/41lYgUn30AL._SX522_.jpg, 1 page.

* cited by examiner

POSITIONING JIG

FIELD

The present disclosure relates generally to construction and assembly of cabinetry and other furniture or fixtures with drawers or doors.

BACKGROUND

Disassembled cabinets and other furniture or fixtures may be shipped with drawer fronts or doors separate from handles that will be used on the drawer or door. The handles are often installed after the doors and drawer fronts are in place and adjusted.

When installing multiple handles on drawer fronts or doors, holes may be drilled and screws used to install the handles at corresponding positions on each drawer front or door. Given the large number of individual holes that must be drilled and screws that must be installed at a typical job site, there may be advantages to connecting the handles with the drawer fronts and doors in a way that is amenable to finishing a large number of handles in a relatively short time.

In some approaches, a technician marks the vertical center of the right and left extremes of the drawer front, places a horizontal masking tape roughly in a horizontal line between the two markings, and draws a line across the tape between the pencil marks and measures to find the center of this line. If the handle is a single knob, the technician drills in the middle for a knob screw. For a two-screw handle, half the separation of the screws is measured out to the right and to the left to position the screw holes.

In some approaches, a technician prepares a drilling jig onsite, often from a scrap of wood, marks the horizontal center of the drawers to locate the jig, and measures from the horizontal center outwards based on the width of the handle to mark the drawer for drilling for a two-screw handle. The jig may be used for different projects, resulting in many individual holes in the jig. Where the holes are added to the jig ad hoc, the jig may become confusing to use and increase the risk of technician error. In addition, wooden jigs will slowly degrade and lose precision as holes are widened with repeated use.

Examples of previous purpose-built jigs are shown in U.S. Pat. No. 5,807,036 to Lostlen, U.S. Pat. No. 4,981,400 to Stover, U.S. Pat. No. 3,583,823 to Eaton, and U.S. Pat. No. 2,842,860 to Gray.

SUMMARY

Previous jigs, including the specific examples referenced in the background, suffer from shortcomings including cumbersome design, poor balance when used on a workpiece (e.g. a drawer, a cabinet, a long drawer, etc.), limited adjustability of guide hole position, requiring measurement to correctly space guide holes, or combinations of these deficiencies. It is an object of the present disclosure to obviate or mitigate at least one disadvantage of previous jigs.

A jig as provided herein includes arms that translate in and out of a pinion body along a length of the pinion body. The arms are separated from each other along a width of the pinion body, the width perpendicular to the length. The arms are engaged with each other by a pinion to equalize translation of the two arms with respect to the pinion body. When the arms are translated along the length, the pinion rotates about an axis parallel to a height of the pinion body. The pinion body extends along the width, defining a contact surface for orienting the pinion body with respect to a workpiece. A jig body is connected with the pinion body, the height perpendicular to each of the width and the length. Apertures are defined within the jig body for providing guide holes to locate a drill hole or other target point on the workpiece. The drill hole or other target point may be for securing an attachment (e.g. a handle, decorative feature, etc.) to the workpiece. The jig body may be translatable with respect to the pinion body along a path parallel to the height for locating the apertures with respect to the pinion body and contact surface.

In a first aspect, herein provided is a positioning jig for locating drill holes or other targets in a workpiece on which the positioning jig is positioned. The positioning jig includes a pinion body and a pair of arms extending from the pinion body. The pair of arms are engaged with a pinion in the pinion body to provide a rack and pinion mechanism for centering the positioning jig on a workpiece. A jig body including at least one aperture is connected with the pinion body. The jig body may be translated with respect to the pinion body for locating the at least one aperture at a target point on the workpiece for drilling a hole or marking the workpiece.

In a further aspect, herein provided is a positioning jig comprising: a pinion body having a length perpendicular to a height; a pair of arms translatably received within the pinion body for translating relative to the pinion body parallel to the length; a pinion within the pinion body and engaged with the arms for providing a rack and pinion mechanism including the arms; a jig body translatably connected with the pinion body for translating the jig body relative to the pinion body parallel to the height, the jig body having at least on aperture defined therein for locating a target point to the at least one aperture in a workpiece on which the jig body is positioned In some embodiments, the positioning jig includes a translation member translatably received within the pinion body and extending from the pinion body parallel to the height of the pinion body for translating the translation member relative to the pinion body; and the jig body extends from the translation member for translating the translation member and the jig body relative to the body parallel to the height.

In some embodiments, the positioning jig includes a translation member extending from the pinion body parallel to the height; and the jig body is translatably received on the translation member for translating the jig body along the translation member relative to the body parallel to the height.

In some embodiments, the positioning jig includes a stop on each of the pair of arms for abutting the workpiece to locate the jig with respect to the workpiece. In some embodiments, each stop is rotatably engaged with the respective arm for engaging with the workpiece to locate the positioning jig with respect to the workpiece on surfaces of the work piece at varying angles as between the surfaces.

In some embodiments, the positioning jig includes the arms are separated from each other along the width; the pinion is located intermediate the arms along the width for rotating the pinion about a pinion axis when the arms are translated relative to the pinion body along the length; and the pinion axis is defined along a height of the pinion body, the height being perpendicular to the width and the length. In some embodiments, at least a portion of the pinion body in which the arms are received extends along the width to provide a contact surface for stabilizing the pinion body on the workpiece. In some embodiments, the pinion is in plane with the width. In some embodiments, the contact surface is at least partially coextensive with at least one of the pair of arms inside the pinion body.

In some embodiments, the positioning jig includes a static jig body translatably connected with the jig body; a guide member extending from the static jig body parallel to the length; at least one translatable jig body translatably received on the guide member for translating the translatable jig body parallel to the length with respect to the static jig body; and the at least one aperture comprises at least one aperture on the translatable jig body. In some embodiments, the at least one aperture comprises at least one aperture on the static jig body. In some embodiments, at least one translatable jig body comprises a first translatable jig body and a second translatable jig body, the first translatable jig body positioned on the guide member opposed from the second translatable jig body. In some embodiments, a first pin on the first translatable jig body and a second pin on the second translatable jig body, the first pin and the second pin for supporting an attachment to position the attachment during connection of the attachment to the workpiece.

In some embodiments, the at least one aperture comprises a center aperture and a plurality of lateral apertures located along the jig body and for providing pairs of apertures along the jig body. In some embodiments, the positioning jig includes a plurality of pins on the jig body, each pin of the plurality of pins extending from the jig body proximate a lateral aperture of the plurality of lateral apertures, the pins for supporting an attachment to position the attachment during connection of the attachment to the workpiece.

In a further aspect, herein provided is a method of locating a target point on a workpiece comprising: providing a positioning jig including a pair of arms in a rack and pinion mechanism received within a pinion body and a jig body translatably connected with the pinion body, the jig body including at least one aperture defined thereon; locating a centerpoint on the workpiece using the pair of arms; stabilizing the pinion body against the workpiece; and translating the jig body with respect to the pinion body to locate one or more apertures of the at least one aperture at the target point.

In some embodiments, the method includes locking the arms in position with respect to the pinion body for maintaining the centerpoint for use on a second example of the workpiece.

In some embodiments, the method includes locking the jig body in position with respect to the pinion body for maintaining the centerpoint for use on a second example of the workpiece.

In some embodiments, the centerpoint is defined along a substantially horizontal edge of the workpiece and stabilizing the pinion body against the workpiece comprises resting the pinion body on the workpiece.

In some embodiments, the centerpoint is defined along a substantially vertical portion of the workpiece and stabilizing the pinion body against the workpiece comprises abutting the pinion body against the workpiece.

In some embodiments, the method includes connecting an attachment to the jig body for locating the attachment on the workpiece relative to the target point.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures, in which features sharing reference numerals with a common final two digits of a reference numeral correspond to similar features across multiple figures (e.g. the pinion body 20, 120, 220, etc.).

DETAILED DESCRIPTION

Figure 1:
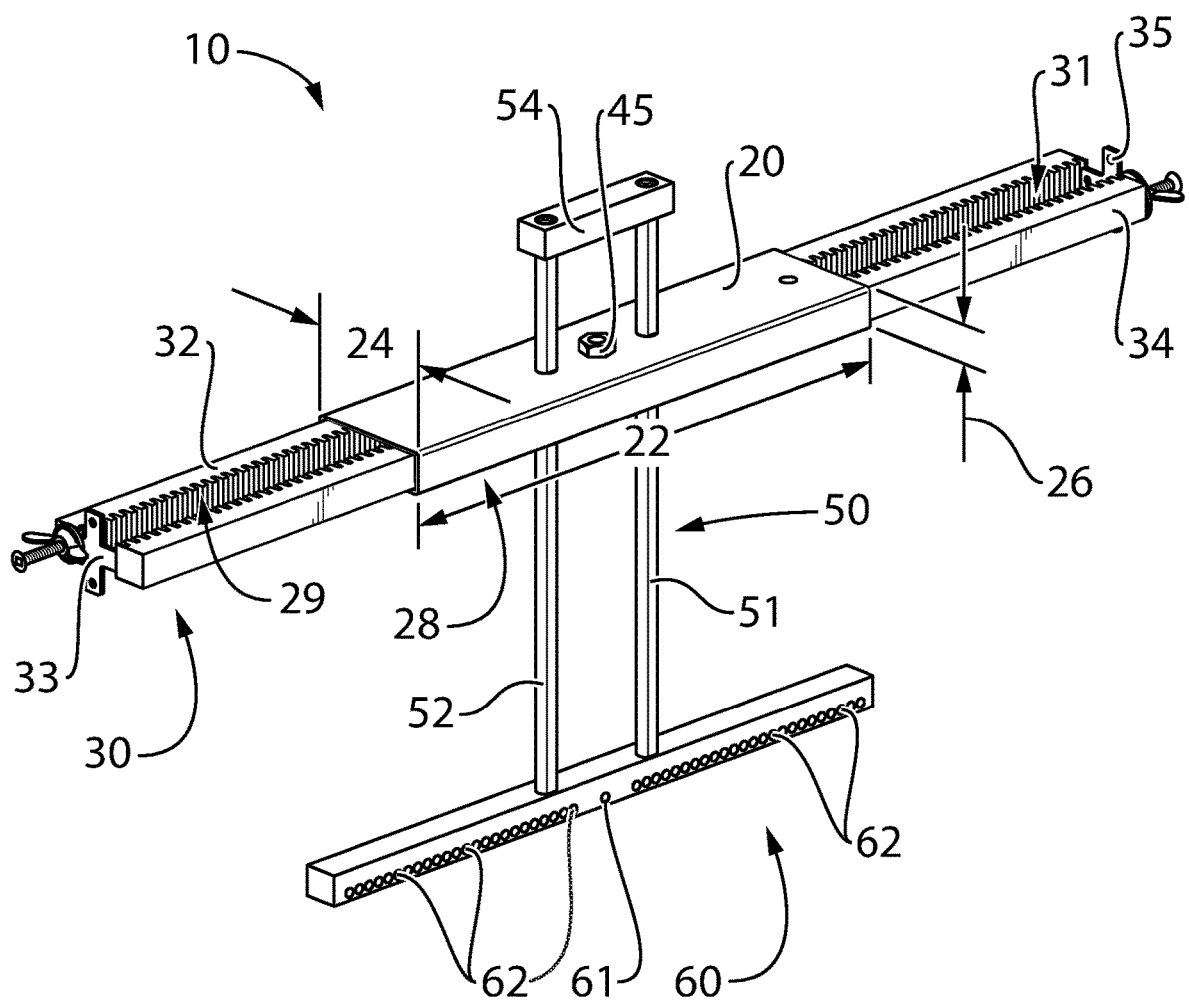
FIG. 1 is a perspective view of a positioning jig in a partially retracted position.
Figure 2:
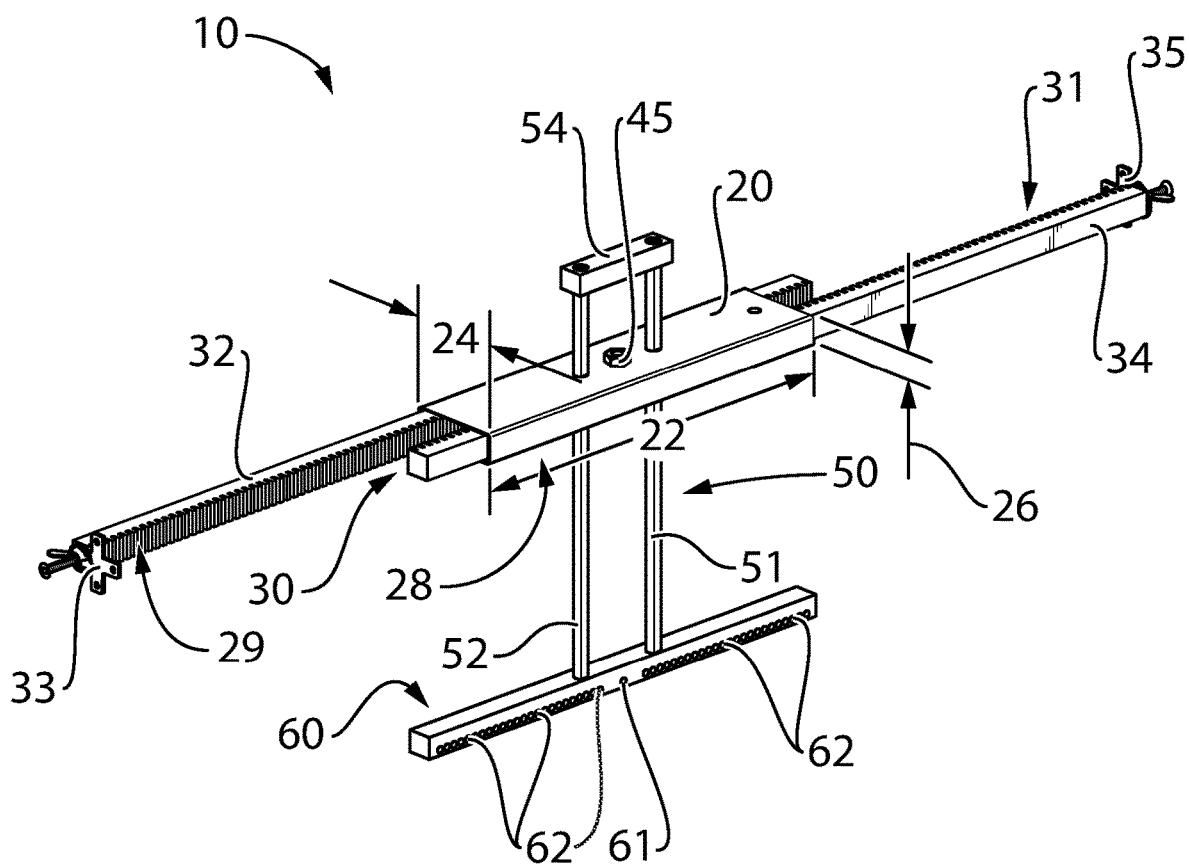
FIG. 2 is a perspective view of the positioning jig of FIG. 1 in a partially extended position.
Figure 3:
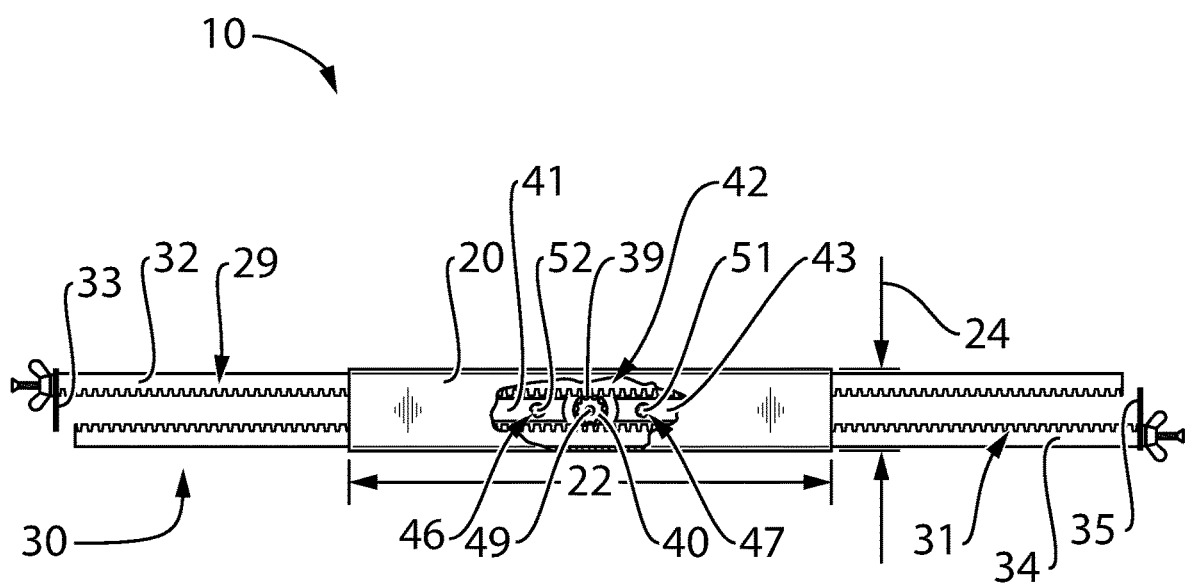
FIG. 3 is a plan view of the positioning jig of FIG. 1 in the partially retracted position.
Figure 4:
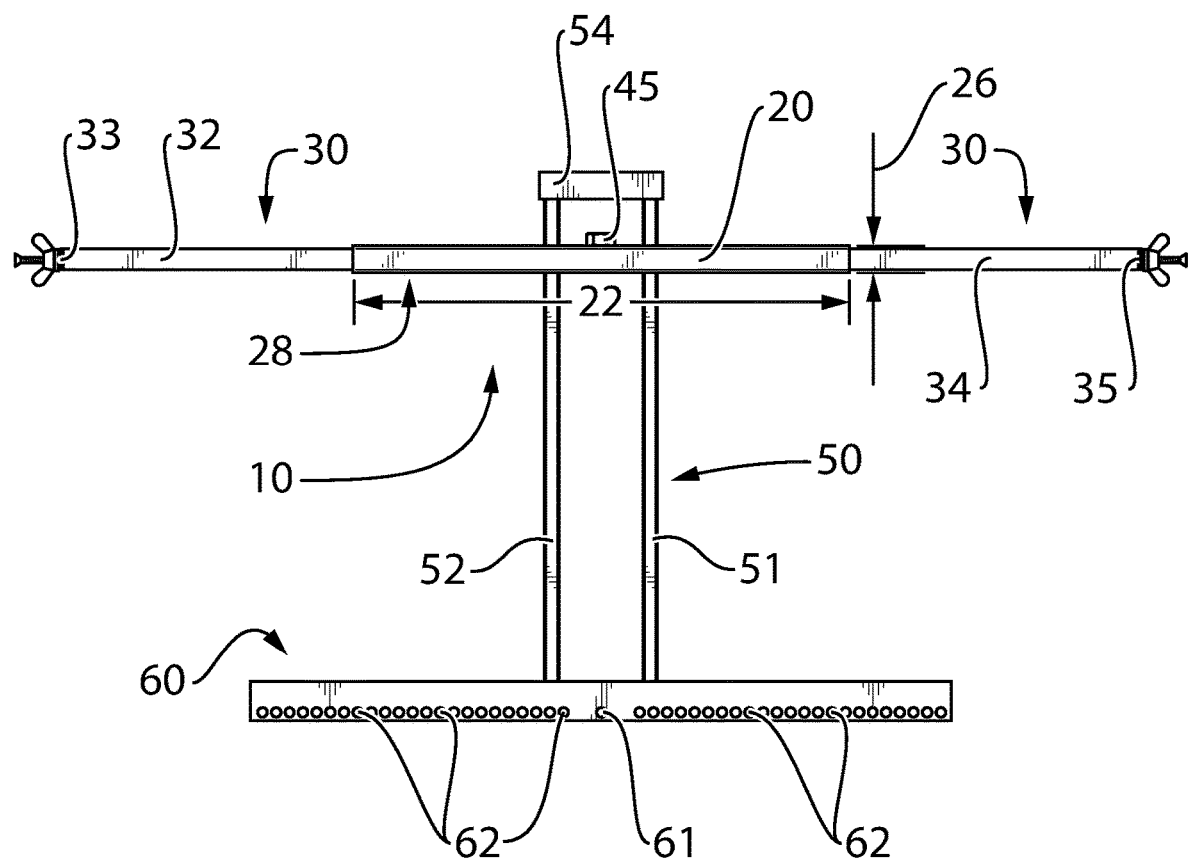
FIG. 4 is an elevation view of the positioning jig of FIG. 1 in the partially retracted position.

Generally, the present disclosure provides a positioning jig for locating drilling holes or other targets in a workpiece and a method of using the positioning jig. The positioning jig and method described herein may obviate or mitigate at least one disadvantage of previous jigs.

Examples of previous jigs are shown in U.S. Pat. No. 5,807,036 to Lostlen, U.S. Pat. No. 4,981,400 to Stover, U.S. Pat. No. 3,583,823 to Eaton, and U.S. Pat. No. 2,842,860 to Gray. Each of these previous jigs suffers from shortcomings including cumbersome design, poor balance when used on a workpiece, limited adjustability of guide hole position, a requirement for measuring to correctly space guide holes, or combinations of these deficiencies. It is an object of the present disclosure to obviate or mitigate at least one disadvantage of previous jigs.

Eaton facilitates locating the horizontal and vertical centers of the drawer without separately measuring. However, the Eaton jig is cumbersome and locations of the guide holes are limited to a narrow range of locations on either side of the knurl dial 81 and are constrained by the wheels 38 and 48. In addition, the Eaton jig locates a large amount of weight on the surface of the workpiece being drilled. The weight of the Eaton jig must be supported on the workpiece during use, which may motivate a technician to remove a drawer or doors and place it on the floor or a bench to use the Eaton jig, rather than drilling with the drawer or doors in place.

Stover facilitates locating the horizontal and vertical centers of the drawer without separately measuring. However, as with Eaton, the Stover jig is cumbersome, and in addition because of the placement of the turn gears 110, 120, the range of guide hole locations is restricted and a large amount of weight is hanging off the drawer when using this jig. Also similarly to Eaton, the Stover jig is off-center, resulting in a large amount of weight hanging off to one side of the jig, which may motivate a technician to remove a drawer or doors and place it on the floor or a bench to use the Stover jig, rather than drilling with the drawer or doors in place.

Gray provides a simple approach to locating the horizontal center of the drawer without measuring. However, setting the location of the drill holes on either side of the center (i.e. the holes 17) is cumbersome, requires measuring, and the only available vertical increments are those that are defined by the holes in the bars 16. In addition, adjusting the vertical bars in a consistent way can be laborious. Gray suffers from a lack of flexibility in the location of the drill holes.

It is an object of the present disclosure to obviate or mitigate at least one disadvantage of previous jigs, such as the disadvantages of Eaton, Stover, and Gray described above.

FIGS. 1 to 4 show a positioning jig 10. The positioning jig 10 includes a pinion body 20. The pinion body 20 extends along a length 22, a width 24, and a height 26 of the pinion body 20. The pinion body 20 extends along the width 24, defining a contact surface 28 for orienting the pinion body 20 with respect to a workpiece (e.g. the workpiece 01 of FIGS. 5 and 6, the drawer 02 of FIG. 7, the door 03 of FIG. 8, the wide drawer 04 of FIGS. 9 and 10, etc.). The contact surface 28 extends along the width 24 for a distance beyond any other components of the positioning jig 10 that may interfere with the contact surface 28 supporting the rest of the positioning jig 10 when the contact surface 28 rests on the workpiece. Such other components may include the translation member 50, which is described in further detail below.

A pair of arms 30, including a first arm 32 and a second arm 34, extends through the pinion body 20 along the length 22. The pair of arms 30 are engaged with a pinion 40 located inside the pinion body 20. The first arm 32 is engaged with the pinion 40 by first arm teeth 29, which match pinion teeth 39 (e.g. ¼" teeth, etc.). The second arm 34 is engaged with the pinion 40 by second arm teeth 31, which match the pinion teeth 39. A pair of spacers 42, including a first spacer 41 and a second spacer 43, is positioned in the pinion body 20 for maintaining the pair of arms 30 at a separation between the first arm 32 and the second arm 34 along the width 24. The pinion body 20 and the pair of spacers 42 locate the first arm 32 parallel to the second arm 34, and the pair of arms 30 parallel to the length 22. The pinion body 20 and the pair of spacers 42 locate the pair of arms 30 in a position of engagement with the pinion 40. A pinion nut 45 is shown securing the pinion 40 to the pinion body 20. A pinion bolt 49 is secured to the pinion nut 45 and the pinion 40 rotates around the pinion bolt 49, for example around a bearing.

The first arm 32 includes a first stop 33 and the second arm 34 includes a second stop 35. The first stop 33 and the second stop 35 each provide an abutment point for locating the positioning jig 10 on a workpiece as shown in FIGS. 5 to 10 (e.g. a drawer, a door, a long drawer, etc.). Together, the pair of arms 30 and the pinion 40 provide a rack and pinion mechanism for linking translation along the length 22 of the first arm 32 with translation along the length 22 of the second arm 34 when the pair of arms 30 are translated with respect to the pinion body 20 along the length 22, such as between a partially retracted position shown in FIG. 1 and a partially extended position shown in FIG. 2. Translation of the first arm 32 along the length 22 rotates the pinion 40, which drives translation of the second arm 34 along the length 22 in the opposite direction.

A translation member 50 is provided by a first translation rod 51 extending parallel to a second translation rod 52. The first translation rod 51 is received within a first aperture 45 defined in the pinion body 20. The second translation rod 52 is received within a second aperture 46 defined in the pinion body 20. The translation member 50 may be translated through and relative to the pinion body 20 along a path parallel to the height 26. A stop 54 connects the first translation rod 51 with the second translation rod 52. The stop 54 may add structural stability and prevent the translation member 50 from translating out of the pinion body 20. While the stop 54 is shown as a crosspiece, any extension of the cross-sectional surface area beyond that of the translation rods 51, 52 may be applied as a stop without connecting the first translation rod 51 with the second translation rod 52.

The translation member 50 may include measurement indicators to define the extent of translation of the translation member 50 through the pinion body 20. The first translation rod 51 and the second translation rod 52 each include measurement indicators. For example, the first translation rod 51 may include 1:1 scale measurements while the second translation rod 52 may include 1:2 scale measurements. Measurement indicators on the translation member 50 may facilitate locating the vertical center of a workpiece by sliding the translation member 50 to the bottom of the work piece, then matching the 1:1 scale to the 1:2 scale.

A jig body 60 is connected with the translation member 50. The jig body 60 includes a central aperture 61 and a plurality of lateral apertures 62 spaced along the jig body 60 parallel to the length 22. The lateral apertures 62 may be positioned in pairs along the jig body 60 between the first translation rod 51 and the second translation rod 52, outward from the first translation rod 51, and outward from the second translation rod 52. The central aperture 61 facilitates locating a drill hole or other target a point in the center of a workpiece on which the jig body 60 is positioning (e.g. a drawer front, a door, etc.). The lateral apertures 62 facilitate locating drill holes or other targets at a selected spacing in the workpiece. The jig body 60 may also provide some structural support to the translation member 50.

Figure 5:
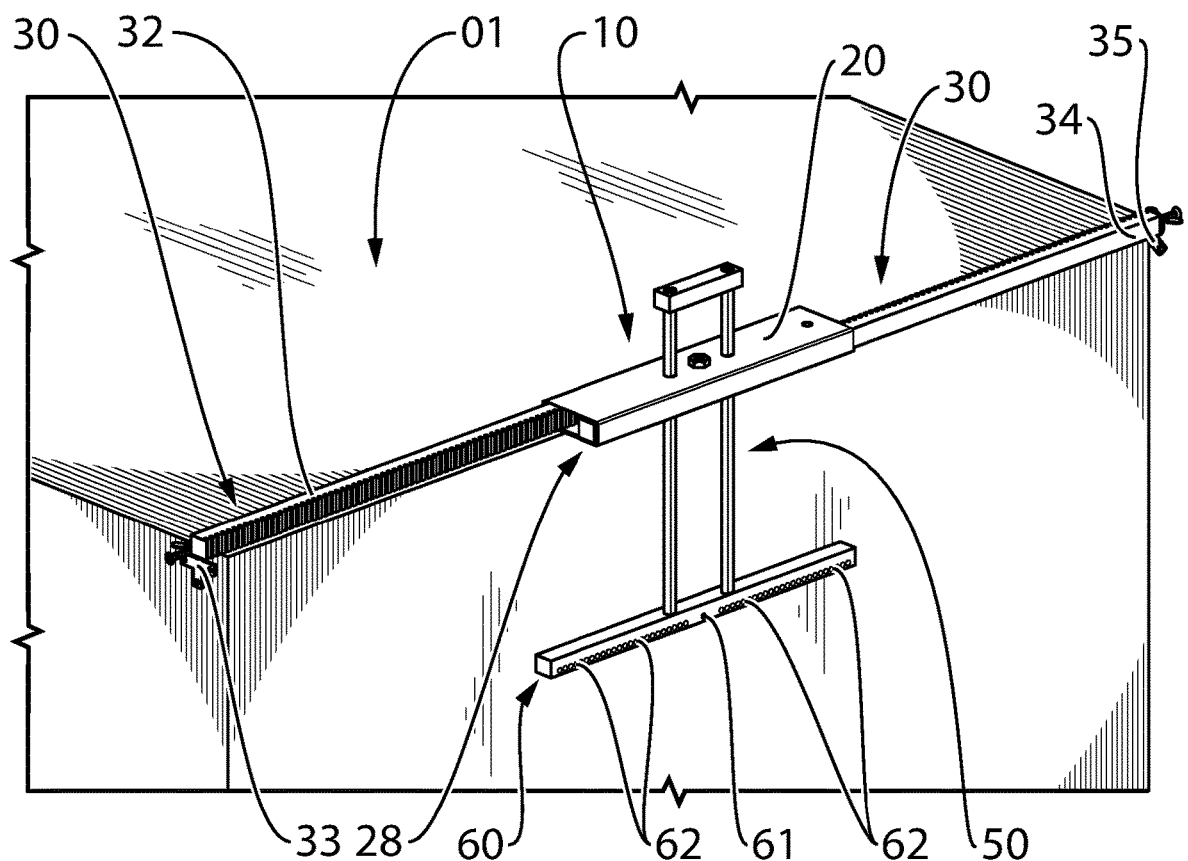
FIG. 5 is a perspective view of the positioning jig of FIG. 1 abutting a horizontal surface of a workpiece.
Figure 6:
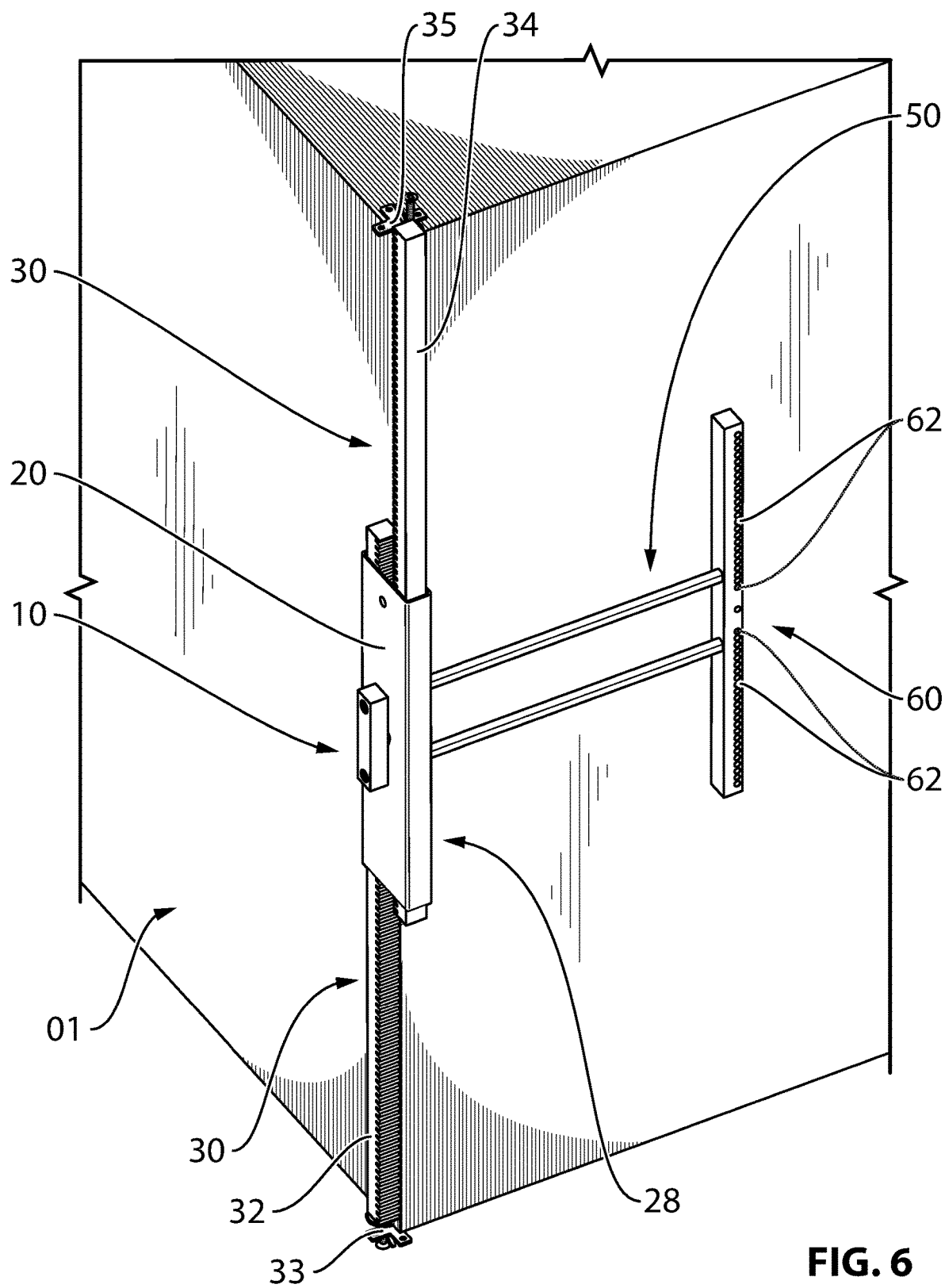
FIG. 6 is a perspective view of the positioning jig of FIG. 1 abutting a vertical surface of a workpiece.

FIGS. 5 and 6 show the positioning jig 10 in use on a generic workpiece 01 for locating a drill hole or other target on the workpiece 01. The pair of arms 30 is extended to span across the workpiece 01, locating the positioning jig 10 proximate a center of the workpiece 01. When one of the pair of arms 30 is translated parallel to the length 22, the other of the pair of arms 30 translates equally in an opposite direction by action of the pinion 40. The rack and pinion nature of the pair of arms 30 and the pinion 40 facilitates locating the horizontal center of the workpiece 01 (FIG. 5) or the vertical center of the workpiece (FIG. 6).

Figure 9:
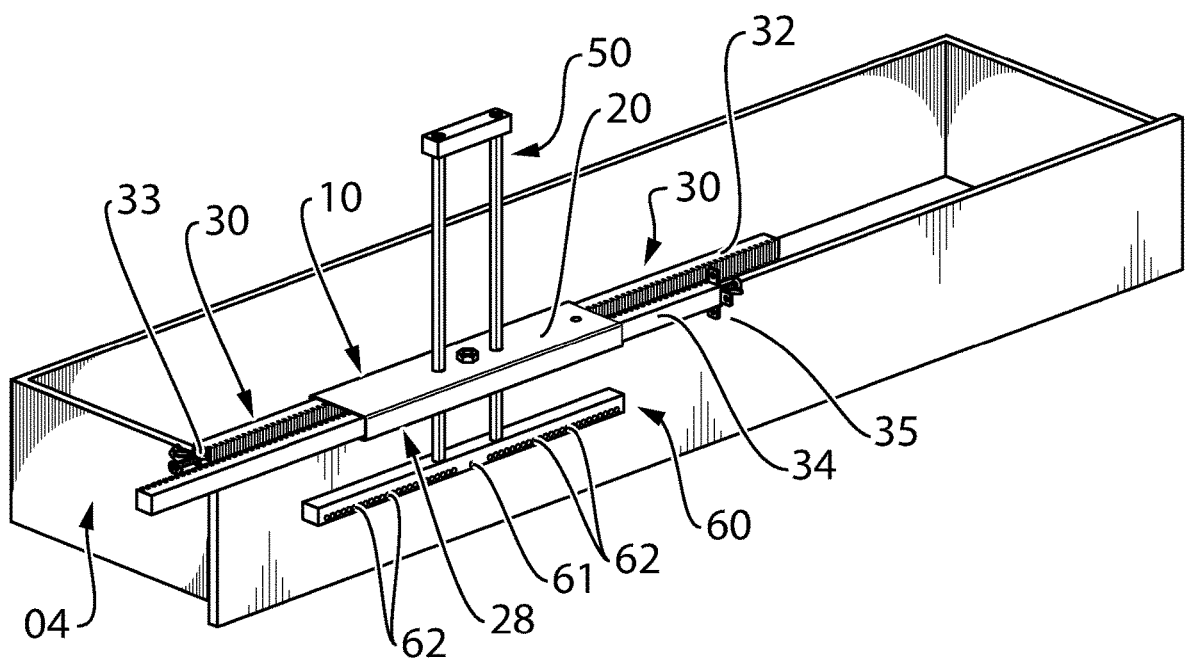
FIG. 9 is a perspective view of the positioning jig of FIG. 1 abutting a first portion of a horizontal surface of a long drawer.
Figure 10:
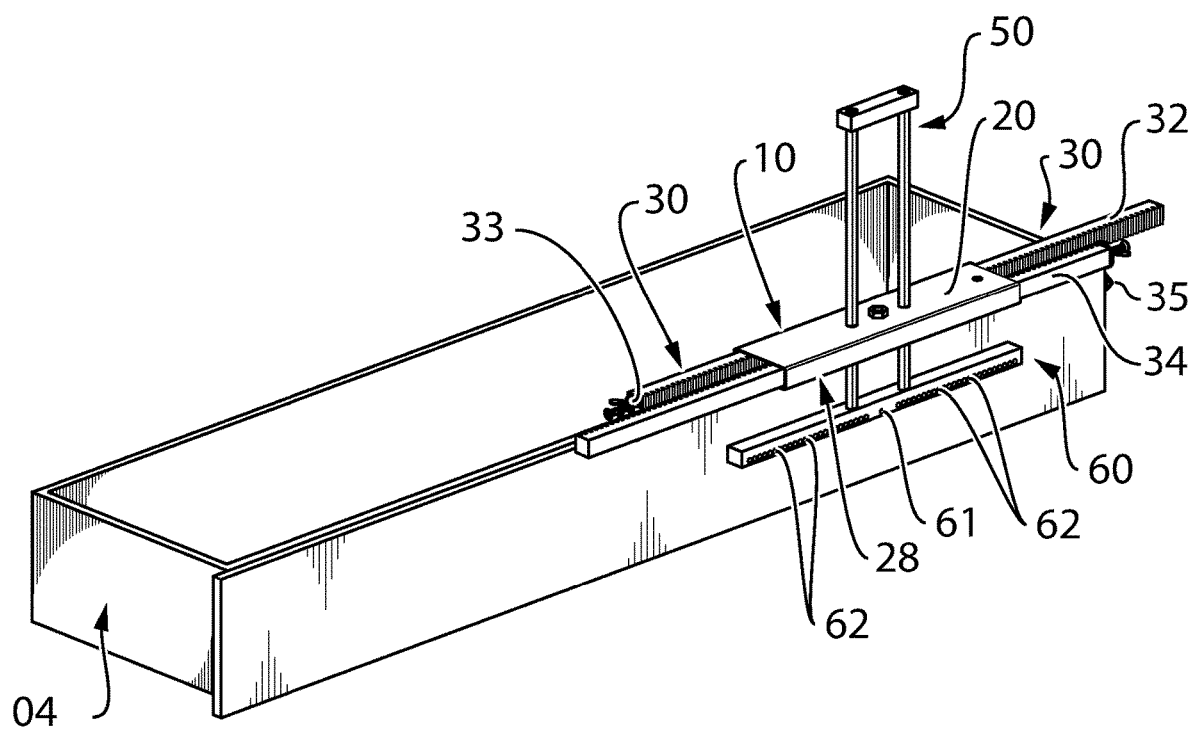
FIG. 10 is a perspective view of the positioning jig of FIG. 1 abutting a second portion of the horizontal surface of the long drawer of FIG. 9.

The first stop 33 and the second stop 35 are pivoted around to abut surfaces of the workpiece 01 and orient the positioning jig 10 with respect to the workpiece 01. Locating the first stop 33 and the second stop 35 on the correct surfaces of the particular workpiece 01 when the pair of arms 30 are positioned at an appropriate separation facilitates locating a horizontal center as between the first stop 33 and the second stop 35, which may correspond to a horizontal center of the workpiece 01 (see FIG. 5). Rotation of the first stop 33 and the second stop 35 facilitates locating a vertical center as between the first stop 33 and the second stop 35, which may correspond to a vertical center of the workpiece 01 (see FIG. 6). In addition, rotation of the first stop 33 or the second stop 35 out of the way to avoid any abutment with the may facilitate, for example, placement relative to one side of a double-long drawer, or installing two attachments (e.g. handles, decorative features, etc.) on a double-long drawer (see. FIGS. 9 and 10).

The positioning jig 10 is supported by the workpiece 01 by resting on the workpiece 01 along the contact surface 28 in FIG. 5. In FIG. 6, while the positioning jig 10 is not supported on the workpiece 01 at the contact surface 28 because the positioning jig 10 is oriented vertically, the contact surface 28 provides a large surface area portion of the positioning jig 10 to be urged against the workpiece 01 to stabilize the positioning jig 10 while marking or drilling the drill hole or other target. The translation member 50 may then be translated with respect to the pinion body 20 to locate the jig body 60 at the correct distance from the pinion body 20 to locate the central aperture 61, the lateral apertures 62, or both, at the intended location of a drill hole or other target on the work piece 01.

Figure 7:
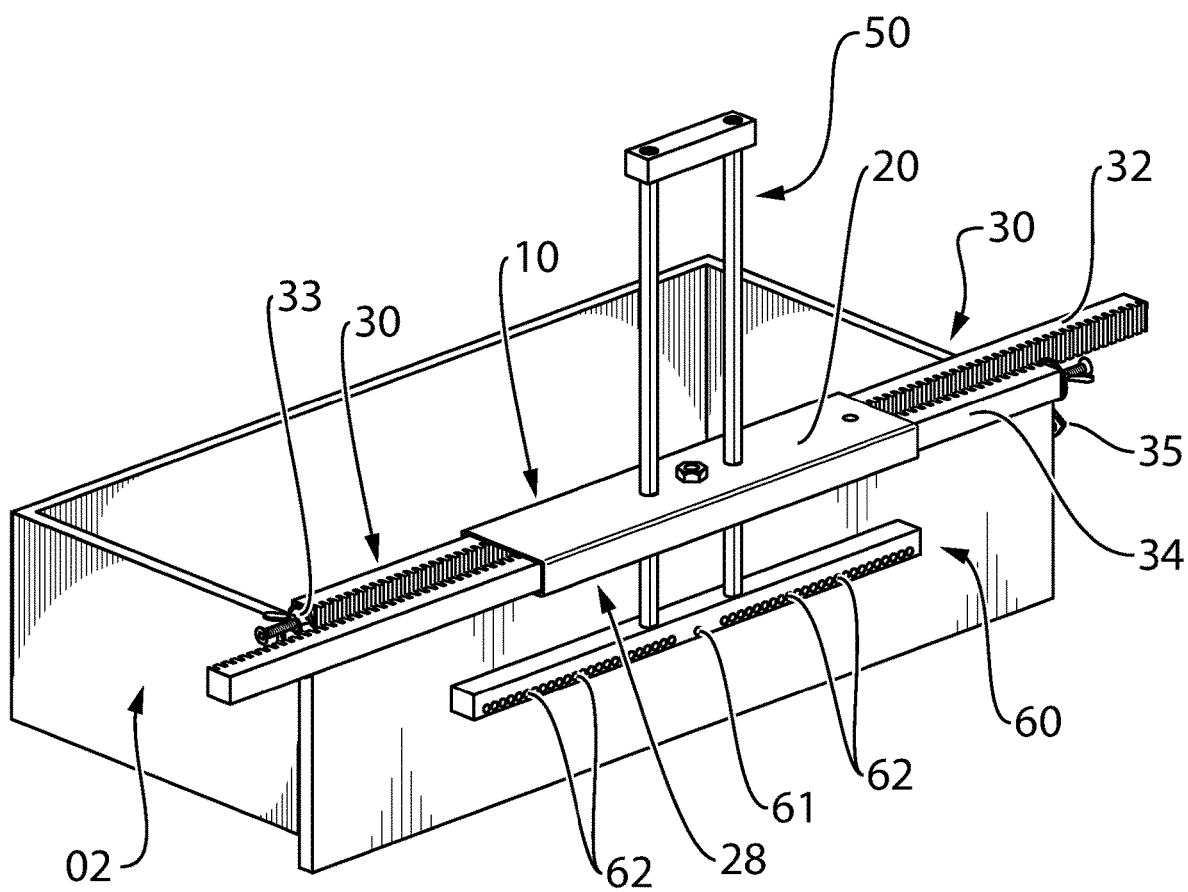
FIG. 7 is a perspective view of the positioning jig of FIG. 1 abutting a horizontal surface of a drawer.

FIG. 7 shows the positioning jig 10 in use on a drawer 02. The translation member 50 is partially retracted to locate the central aperture 61, the lateral apertures 62, or both, at a portion of the drawer 02 where a handle will be attached to the drawer 02.

Figure 8:
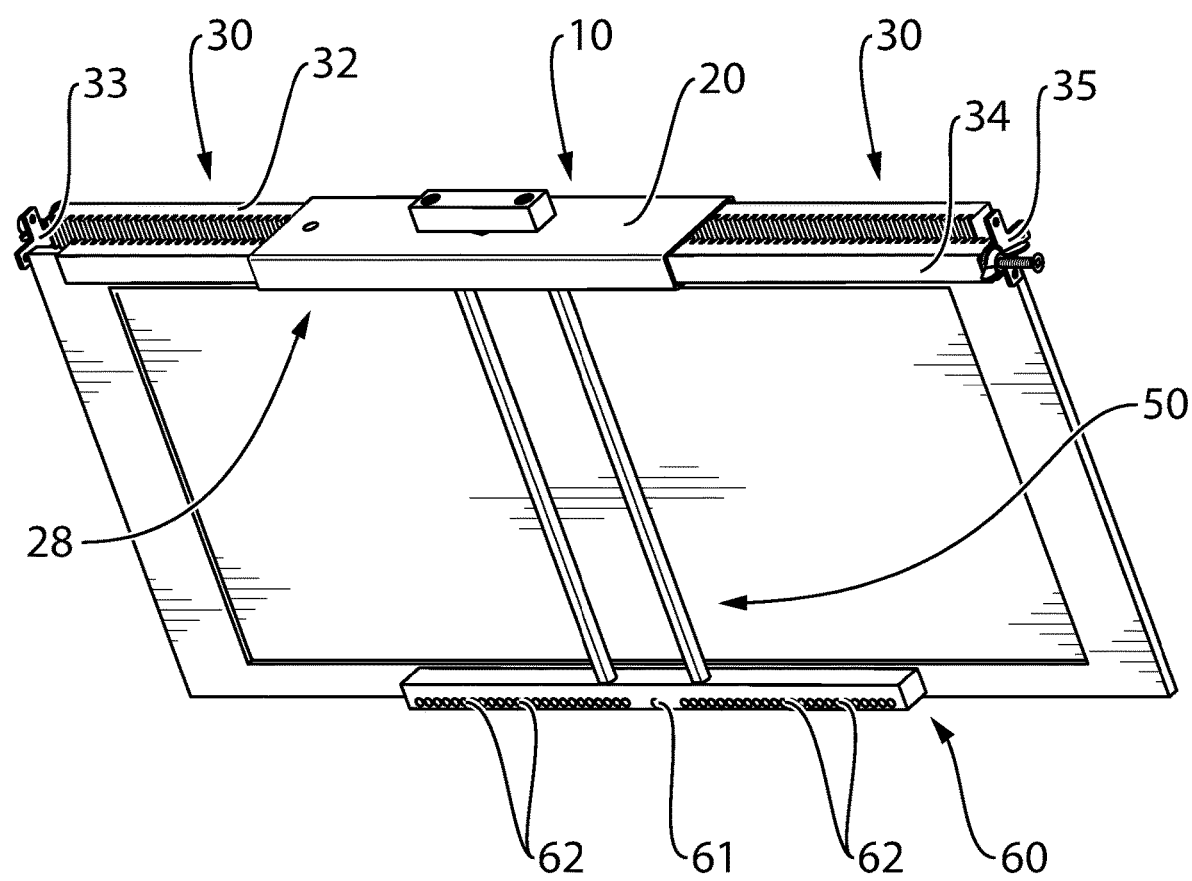
FIG. 8 is a perspective view of the positioning jig of FIG. 1 abutting a vertical surface of a cabinet door.

FIG. 8 shows the positioning jig 10 in use on a cabinet door 03. The translation member 50 is fully extended to locate the central aperture 61, the lateral apertures 62, or both, on the jig body 60 at a portion of the cabinet door 03 where a handle will be attached to the cabinet door 03.

FIGS. 9 and 10 show the positioning jig 10 in use on a long drawer 04.

In FIG. 9, at a first portion of the long drawer 04 where a first anchor point of a pair of anchor points will be located (e.g. for attaching a first side of a handle, for attaching a first side of a decorative feature, etc.) to the long drawer 04. The translation member 50 is partially retracted to locate the central aperture 61, the lateral apertures 62, or both. The second stop 35 is rotated outward from the long drawer 04 to avoid interference with the surface of the long drawer 04 while the jig 10 is positioned on the long drawer 04. After drilling or marking a first hole at the portion of the long drawer 04 defined in FIG. 9, the positioning jig 10 may be repositioned to drill or mark a second hole as shown in FIG. 10.

FIG. 10 shows the positioning jig 10 repositioned to a second portion of the long drawer 04 separated from the first portion along a length of the long drawer 04. In FIG. 10, the first stop 33 is rotated outward from the long drawer 04 to avoid interference with the surface of the long drawer 04 while the jig 10 is positioned on the long drawer 04, and the second stop 35 engaged with the long drawer 04.

Together, the first stop 33, the second stop 35, and the contact surface 28 locate the positioning jig 10 on the workpiece 01, the drawer 02, the cabinet door 03, or the long drawer 04. The translation member 50 may then be translated with respect to the pinion body 20 to locate the jig body 60 at the correct distance from the pinion body 20 to locate the central aperture 61, the lateral apertures 62, or both, at the intended location of a drill hole or other target. Locking the positioning of the pair of arms 30, the translation member 50, or both before repositioning facilitates locating the jig body 60, including the central aperture 61 and the lateral apertures 62, at a consistent location on two sides of the long drawer 04. Similarly, where drilling holes in multiple separate work pieces (e.g. multiple examples of the workpiece 01, the drawer 02, the cabinet door 03, or the long drawer 04, etc.), locking the pair of arms 30, the translation member 50, or both, with respect to the pinion body 20 facilitates consistent location of the drill holes across the multiple workpieces. Locking the positioning of the pair of arms 30, the translation member 50, or both, may be facilitated by any known position lock (e.g. a screw lock, a switch lock, a magnet lock, a cambered friction lock, etc.).

The pair of arms 30 and the pinion 40 allow the horizontal and vertical centers of a work piece to be located without separate measuring. The translation member 50 and the jig body 60, which may be translated relative to the pinion body 20, allow corresponding vertical and horizontal centers to be located without separate measuring through use of the measurement indicators on the first translation rod 51 and the second translation rod 52. Locating the arms 30, the pinion 40, and the pair of separators 42 in the pinion body 20 allows the positioning jig 10 to be placed on top of the workpiece 01, the drawer 02, or the cabinet door 03 away from the target location on the workpiece 01, the drawer 02, or the cabinet door 03.

Locating the central aperture 61, the lateral apertures 62, or both, in the jig body 60 facilitates locating the majority of the weight of the positioning jig 10 away from the pinion body 20. In FIG. 5, the pinion body 20 is resting on the workpiece 01 at the contact surface 28 and is vertically separated from jig body 60. In FIG. 6, the pinion body 20 is stabilized against the work piece 01 at the contact surface 28 and is horizontally separated from jig body 60. In FIG. 7, the pinion body 20 is resting on the drawer 02 at the contact surface 28 and is vertically separated from jig body 60. In FIG. 8, the pinion body 20 is stabilized against the cabinet door 03 at the contact surface 28 and is vertically separated from jig body 60. Locating the pinion body 20 distally from the jig body 60 may facilitate use of the positioning jig 10 while the drawer 02, cabinet door 03, or other workpiece 01 is in place. Locating the pinion body 20 distally from the jig body 60 may mitigate restrictions on locations of the central aperture 61, the lateral apertures 62, or both, which would result from placing the apertures directly on the pinion body 20. Locating the pinion body 20 distally from the jig body 60 may facilitate swapping out a different jig body for the jig body 60. Replacing the jig body 60 with the different jig body may facilitate use of the positioning jig 10 with a smaller jig body, facilitate changing the separation pattern between apertures on the jig body, facilitate adding a different jig body (e.g. the jig body 172 of FIGS. 11 to 13, etc.) may facilitate using disposable or replaceable jig bodies, or provide other benefits.

Figure 11:
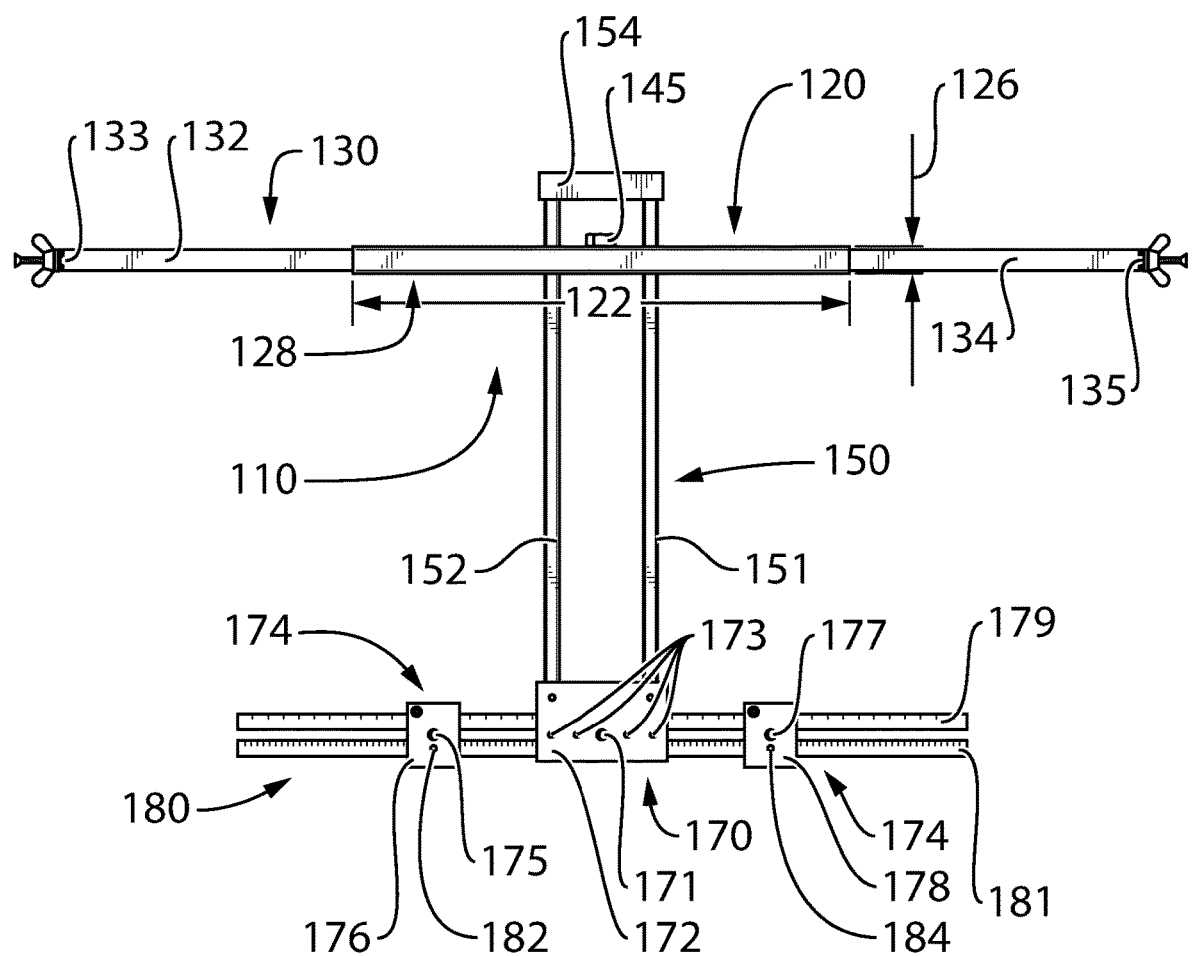
FIG. 11 is an elevation view of a positioning jig in an extended position.
Figure 12:
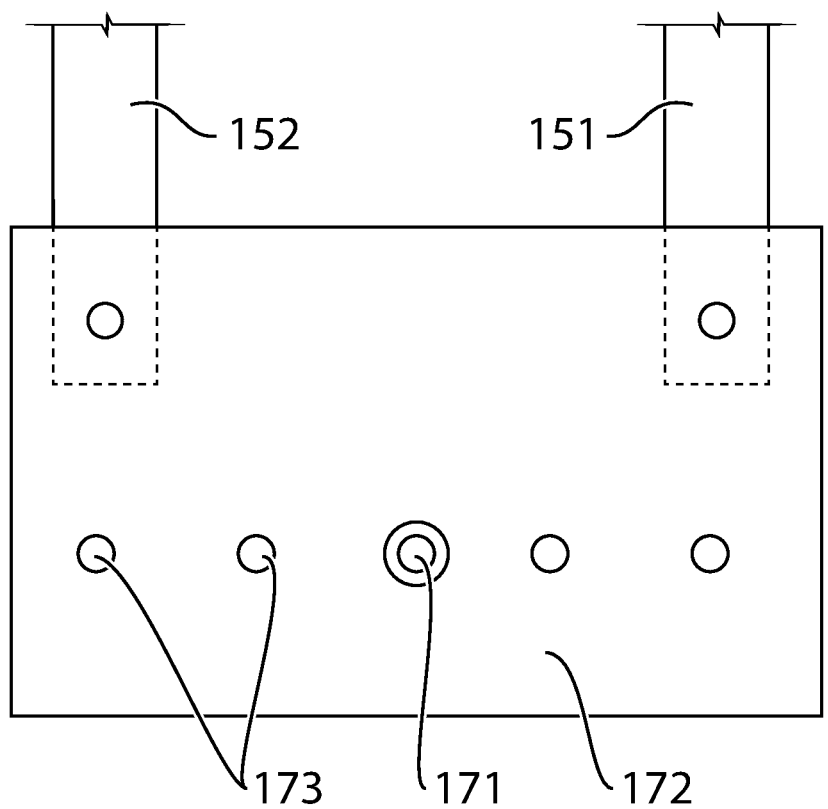
FIG. 12 is an elevation detail view of the positioning jig of FIG. 11.
Figure 13:
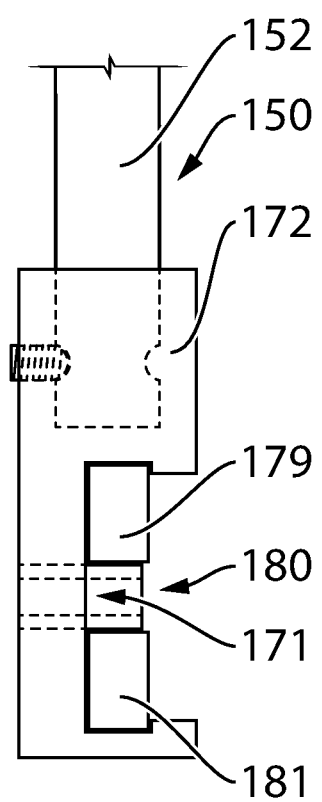
FIG. 13 is an elevation detail view the positioning jig of FIG. 11.

FIGS. 11 to 13 show a positioning jig 110 including a sectional jig body 170. Similarly to the positioning jig 10, the positioning jig 110 includes the pinion body 120. The pinion body 120 extends along the length 122 and the height 126. The pinion body 120 also extends along the width (not shown; similar to the width 24 of the pinion body 20 of the positioning jig 10) to define the contact surface 128 for orienting the pinion body 120 with respect to a workpiece. The pair of arms 130 including the first arm 132 and the second arm 134 extends through the pinion body 120 along the length 122. The first arm 32 includes the first stop 33 and the second arm 34 includes the second stop 35. The pair of arms 130 are engaged with a pinion (not shown; similar to the pinion 40 of the positioning jig 10) located inside the pinion body 120. The pinion is secured to the pinion body 120 by the pinion nut 45. The translation member 150 is provided by the first translation rod 151 extending parallel to the second translation rod 152 through the pinion body 120. The stop 154 connects the first translation rod 151 with the second translation rod 152.

The sectional jig body 170 includes a central static jig body 172 and a pair of lateral translatable jig bodies 174 including a first lateral jig body 176 and a second lateral jig body 178. The central jig body 172 and the pair of lateral jig bodies 174 are received on a jig translation member 180. The jig translation member 180 includes a first jig guide 179 and a second jig guide 181. The jig translation member 180 extends along parallel to the length 122. The first lateral jig body 176 and the second lateral jig body 178 may each be translated along the jig translation member 180.

The central jig body 172 includes a central aperture 171 and a plurality of lateral apertures 173. The first lateral jig body 176 includes a first lateral jig aperture 175 and the second lateral jig body 178 includes a second lateral jig aperture 177. The central aperture 171 and the plurality of lateral apertures 173 provide apertures in which to drill or otherwise locate targets proximate the translation member 150, as such between the first translation rod 151 and the second translation rod 152. The first lateral jig body 176 and the second lateral jig body 178 may each be translated along the jig translation member 180 to locate drill holes or other targets at a broader lateral spacing than provided by the lateral apertures 173.

The jig translation member 180 may include measurement indicators to facilitate locating the first lateral jig body 176 at a selected distance from the second lateral jig body 178. The first jig guide 179 may include measurements increasing from right to left on the lefthand side of the translation member 150 for translating the first lateral jig body 176, and the second jig guide 181 may include measurements increasing from left to right on the righthand side of the translation member 150 for translating the second lateral jig body 178. With these markings, the first jig guide 179 may be in inches or other imperial units, and the second jig guide 181 may include centimeters or other metric units. Using such units, the first lateral jig body 176 and the second lateral jig body 178 may be located at a selected distance from the central aperture 171, which may be applied as a center point reference.

The first lateral jig body 176 includes a first pin 182 and the second lateral jig body 178 includes a second pin 184. When positioning a drawer handle or otherwise drilling holes that are going to be used to mount a feature on a workpiece, the drawer handle or other feature may be placed over the first pin 182 and the second pin 184 by positioning holes in the drawer handle or other feature on the first pin 182 and the second pin 184, hanging the drawer handle or other feature on the first lateral jig body 176 and the second lateral jig body 178. Hanging the drawer handle or other feature from the first pin 182 on the first lateral jig body 176 and from the second pin 184 on the second lateral jig body 178 provides a simple and reliable way to locate the drawer handle or other feature at the intended location on the workpiece. Similarly, pins may be included on a jig body similar to the jig body 60 of the positioning jig 10, with the pins being located over each of the lateral apertures, similar to the lateral apertures 62.

Figure 14:
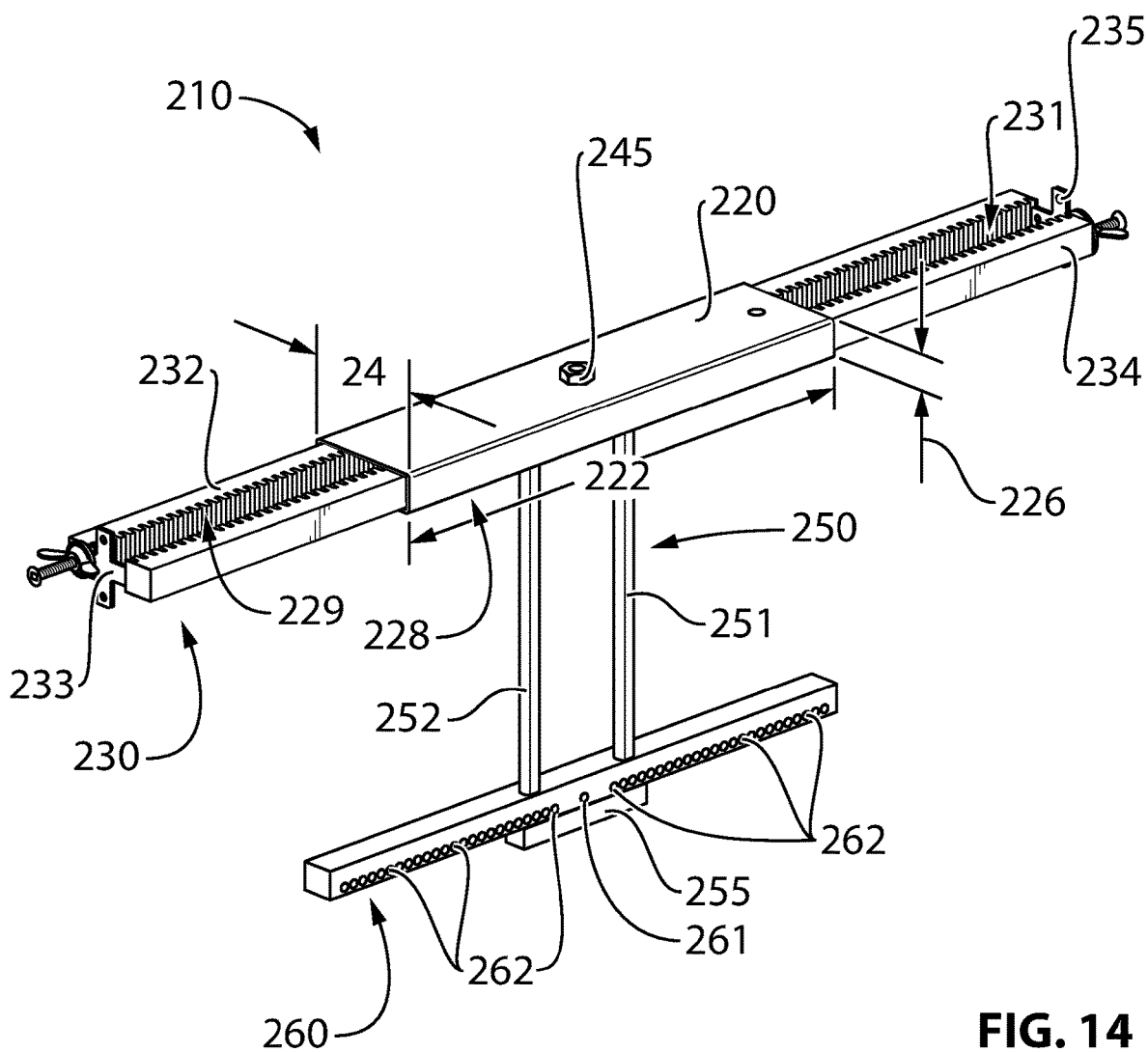
FIG. 14 is a perspective view of a positioning jig in a retracted position.
Figure 15:
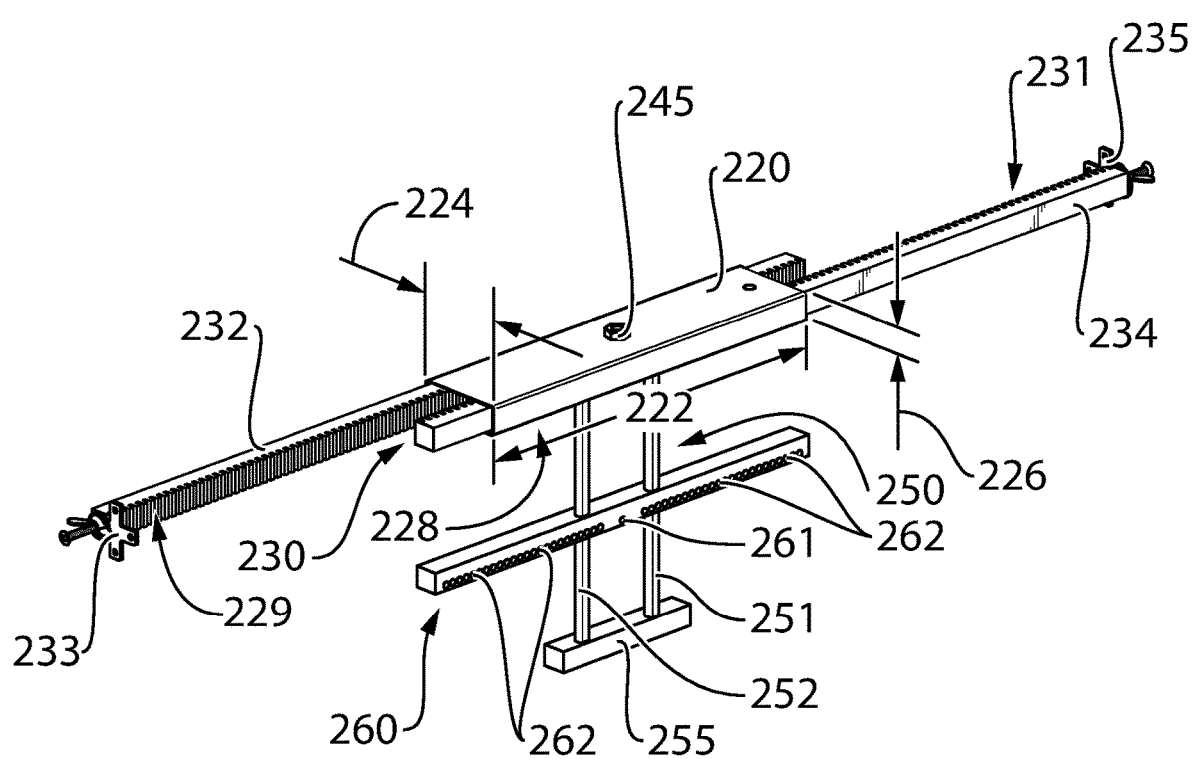
FIG. 15 is a perspective view of the positioning jig of FIG. 14 in an extended position.

FIGS. 14 and 15 show a positioning jig 210 in which the translation member 250 is fixed to the pinion body 220. Similarly to the positioning jig 10, the positioning jig 210 includes the pinion body 220. The pinion body 220 extends along the length 222 and the height 226 of the pinion body 220. The pinion body 220 also extends along the width 224 to define the contact surface 228 for orienting the pinion body 220 with respect to a workpiece. The pair of arms 230 including the first arm 232 and the second arm 234 extends through the pinion body 220 along the length 222. The first arm 232 includes the first stop 233 and the second arm 234 includes the second stop 235. The pair of arms 230 are engaged with a pinion (not shown; similar to the pinion 40 of the positioning jig 10) located inside the pinion body 220 at the first arm teeth 229 and the second arm teeth 231. The pinion is secured to the pinion body 220 by the pinion nut 245. The jig body 260 includes a central aperture 261 and a plurality of lateral apertures 262 spaced along the jig body 260 parallel to the length 222.

The jig body 260 translates along the translation member 250. The jig body 260 translatably receives each of the first translation rod 251 and the second translation rod 252 within the jig body 260 for translating the jig body 260 relative to the pinion body 220 along a path parallel to the height 226. The translation member 250 includes a crosspiece 255 between the first translation rod 251 and the second translation rod 252 to prevent the jig body 260 from translating off the translation member 250.

Similarly to the positioning jig 10 and the positioning jig 110, the jig body 260 may be translated with respect to the pinion body 220 along a path parallel to the height 226. In the positioning jig 210, the jig body 260 translates along the translation member 250, and the translation member 250 is fixed in relation to the pinion body 220. In the positioning jig 10, the translation member 50 translates in relation to the pinion body 20, and the jig body 60 is fixed in relation to the translation member 50. In the positioning jig 10, the translation member 50 translates in relation to the pinion body 20, and the jig body 60 is fixed in relation to the translation member 50.

Examples Only

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A positioning jig comprising:
 a pinion body having a length perpendicular to a height;
 a pair of arms translatably received within the pinion body for translating relative to the pinion body parallel to the length;
 a pinion within the pinion body and engaged with the arms for providing a rack and pinion mechanism including the arms;
 a jig body translatably connected with the pinion body for translating the jig body relative to the pinion body parallel to the height, the jig body having at least one aperture defined therein for locating a target point to the at least one aperture in a workpiece on which the jig body is positioned; and
 a stop on each of the pair of arms for abutting the workpiece to locate the jig with respect to the workpiece;
 wherein each stop being rotatably engaged with the respective arm for engaging with the workpiece to locate the positioning jig with respect to the workpiece on surfaces of the work piece at varying angles as between the surfaces;

the arms are separated from each other along the width of the pinion body;

the pinion is located intermediate the arms along the width of the pinion body for rotating the pinion about a pinion axis when the arms are translated relative to the pinion body along the length; and the pinion axis is defined along the height, the height being perpendicular to the width of the pinion body and the length of the pinion body.

2. The positioning jig of claim 1 further comprising a translation member translatably received within the pinion body and extending from the pinion body parallel to the height of the pinion body for translating the translation member relative to the pinion body; and wherein the jig body extends from the translation member for translating the translation member and the jig body relative to the pinion body parallel to the height.

3. The positioning jig of claim 1 further comprising a translation member extending from the pinion body parallel to the height; and wherein the jig body is translatably received on the translation member for translating the jig body along the translation member relative to the body parallel to the height.

4. The positioning jig of claim 1 wherein at least a portion of the pinion body in which the arms are received extends along the width to provide a contact surface for stabilizing the pinion body on the workpiece.

5. The positioning jig of claim 1 wherein the pinion is in plane with the width.

6. The positioning jig of claim 4 wherein the contact surface is at least partially coextensive with at least one of the pair of arms inside the pinion body.

7. The positioning jig of claim 1 wherein the jig body comprises:

a static jig body translatably connected with the jig body;

a guide member extending from the static jig body parallel to the length;

at least one translatable jig body translatably received on the guide member for translating the translatable jig body parallel to the length with respect to the static jig body; and the at least one aperture comprises at least one aperture on the translatable jig body.

8. The positioning jig of claim 7 wherein the at least one aperture comprises at least one aperture on the static jig body.

9. The positioning jig of claim 7 wherein at least one translatable jig body comprises a first translatable jig body and a second translatable jig body, the first translatable jig body positioned on the guide member opposed from the second translatable jig body.

10. The positioning jig of claim 9 further comprising a first pin on the first translatable jig body and a second pin on the second translatable jig body, the first pin and the second pin for supporting an attachment to position the attachment during connection of the attachment to the workpiece.

11. The positioning jig of claim 1 wherein the at least one aperture comprises a center aperture and a plurality of lateral apertures located along the jig body and for providing pairs of the lateral apertures along the jig body.

12. The positioning jig of claim 11 further comprising a plurality of pins on the jig body, each pin of the plurality of pins extending from the jig body proximate a lateral aperture of the plurality of lateral apertures, the pins for supporting an attachment to position the attachment during connection of the attachment to the workpiece.

13. A method of locating a target point on a workpiece comprising:

providing a positioning jig comprising:

a pinion body having a length perpendicular to a height;

a pair of arms translatably received within the pinion body for translating relative to the pinion body parallel to the length;

a pinion within the pinion body and engaged with the arms for providing a rack and pinion mechanism including the arms;

a jig body translatably connected with the pinion body for translating the jig body relative to the pinion body parallel to the height, the jig body having at least one aperture defined therein for locating a target point to the at least one aperture in a workpiece on which the jig body is positioned; and a stop on each of the pair of arms for abutting the workpiece to locate the jig with respect to the workpiece;

wherein each stop being rotatably engaged with the respective arm for engaging with the workpiece to locate the positioning jig with respect to the workpiece on surfaces of the work piece at varying angles as between the surfaces;

the arms are separated from each other along the width of the pinion body;

the pinion is located intermediate the arms along the width of the pinion body for rotating the pinion about a pinion axis when the arms are translated relative to the pinion body along the length; and the pinion axis is defined along the height, the height being perpendicular to the width of the pinion body and the length of the pinion body;

locating a centerpoint on the workpiece using the pair of arms;

stabilizing the pinion body against the workpiece; and translating the jig body with respect to the pinion body to locate one or more apertures of the at least one aperture at the target point.

14. The method of claim 10 further comprising locking the arms in position with respect to the pinion body for maintaining the centerpoint for use on another workpiece.

15. The method of claim 10 further comprising locking the jig body in position with respect to the pinion body for maintaining the centerpoint for use on another workpiece.

16. The method of claim 10 wherein the centerpoint is defined along a substantially horizontal edge of the workpiece and stabilizing the pinion body against the workpiece comprises resting the pinion body on the workpiece.

17. The method of claim 10 wherein the centerpoint is defined along a substantially vertical portion of the workpiece and stabilizing the pinion body against the workpiece comprises abutting the pinion body against the workpiece.

18. The method of claim 10 further comprising connecting an attachment to the jig body for locating the attachment on the workpiece relative to the target point.

19. A positioning jig comprising:

a pinion body having a length perpendicular to a height;

a pair of arms translatably received within the pinion body for translating relative to the pinion body parallel to the length;

a pinion within the pinion body and engaged with the arms for providing a rack and pinion mechanism including the arms;

a jig body translatably connected with the pinion body for translating the jig body relative to the pinion body parallel to the height, the jig body having at least one aperture defined therein for locating a target point to the at least one aperture in a workpiece on which the jig body is positioned; and a stop on each of the pair of arms for abutting the workpiece to locate the jig with respect to the workpiece;

wherein each stop being rotatably engaged with the respective arm for engaging with the workpiece to locate the positioning jig with respect to the workpiece on surfaces of the work piece at varying angles as between the surfaces; and wherein the at least one aperture comprises a center aperture and a plurality of lateral apertures located along the jig body and for providing pairs of the lateral apertures along the jig body.

20. The positioning jig of claim 19 further comprising a translation member translatably received within the pinion body and extending from the pinion body parallel to the height of the pinion body for translating the translation member relative to the pinion body; and wherein the jig body extends from the translation member for translating the translation member and the jig body relative to the pinion body parallel to the height.

21. The positioning jig of claim 19 further comprising a translation member extending from the pinion body parallel to the height; and wherein the jig body is translatably received on the translation member for translating the jig body along the translation member relative to the body parallel to the height.

22. The positioning jig of claim 19 wherein at least a portion of the pinion body in which the arms are received extends along the width to provide a contact surface for stabilizing the pinion body on the workpiece.

23. The positioning jig of claim 19 wherein the pinion is in plane with the width.

24. The positioning jig of claim 19 wherein the contact surface is at least partially coextensive with at least one of the pair of arms inside the pinion body.

25. The positioning jig of claim 19 wherein the jig body comprises:

a static jig body translatably connected with the jig body;

a guide member extending from the static jig body parallel to the length;

at least one translatable jig body translatably received on the guide member for translating the translatable jig body parallel to the length with respect to the static jig body; and the at least one aperture comprises at least one aperture on the translatable jig body.

26. The positioning jig of claim 25 wherein the at least one aperture comprises at least one aperture on the static jig body.

27. The positioning jig of claim 25 wherein at least one translatable jig body comprises a first translatable jig body and a second translatable jig body, the first translatable jig body positioned on the guide member opposed from the second translatable jig body.

28. The positioning jig of claim 27 further comprising a first pin on the first translatable jig body and a second pin on the second translatable jig body, the first pin and the second pin for supporting an attachment to position the attachment during connection of the attachment to the workpiece.

29. The positioning jig of claim 28 further comprising a plurality of pins on the jig body, each pin of the plurality of pins extending from the jig body proximate a lateral aperture of the plurality of lateral apertures, the pins for supporting an attachment to position the attachment during connection of the attachment to the workpiece.

* * * * *